United States Patent
Fukui

(10) Patent No.: US 6,695,528 B2
(45) Date of Patent: Feb. 24, 2004

(54) METHOD FOR CONSTRUCTING STRUCTURES USEFUL AS SCAFFOLDS ON SLOPES

(76) Inventor: Tomio Fukui, 18-5, Kamiuma 4-chome, Setagaya-ku, Tokyo 154-0011 (JP)

( * ) Notice: Subject to any disclaimer, the term of this patent is extended or adjusted under 35 U.S.C. 154(b) by 0 days.

(21) Appl. No.: 10/240,306

(22) PCT Filed: Mar. 23, 2001

(86) PCT No.: PCT/JP01/02320

§ 371 (c)(1),
(2), (4) Date: Sep. 30, 2002

(87) PCT Pub. No.: WO01/73204

PCT Pub. Date: Oct. 4, 2001

(65) Prior Publication Data

US 2003/0103809 A1 Jun. 5, 2003

(30) Foreign Application Priority Data

Mar. 29, 2000 (JP) ........................ 2000-090429

(51) Int. Cl.[7] ................................................. E06C 1/00
(52) U.S. Cl. ..................................... 404/73; 182/180.1
(58) Field of Search ............................ 404/72, 73, 83; 182/194, 196, 197, 198, 199, 179.1, 180.1, 186.9, 186.7, 230

(56) References Cited

U.S. PATENT DOCUMENTS

| | | | | |
|---|---|---|---|---|
| 4,047,257 A | * | 9/1977 | Bondarchuk, Sr. ............. | 14/27 |
| 4,442,920 A | * | 4/1984 | Gronbeck et al. ........... | 182/199 |
| 4,471,854 A | * | 9/1984 | Heilskov .................... | 182/196 |
| 4,683,981 A | * | 8/1987 | Salvarezza .................. | 182/199 |
| 4,869,345 A | * | 9/1989 | Nilsen ........................ | 182/163 |
| 4,919,182 A | * | 4/1990 | Proulx et al. ................ | 152/221 |
| 5,074,236 A | * | 12/1991 | Robertson ................... | 114/362 |
| 5,080,193 A | * | 1/1992 | Woof .......................... | 182/116 |
| 5,746,287 A | * | 5/1998 | Durham, Jr. ................. | 182/70 |
| 6,527,081 B1 | * | 3/2003 | Tyner et al. .................. | 182/1 |
| 2003/0037991 A1 | * | 2/2003 | Dibelardino et al. ........ | 182/198 |

FOREIGN PATENT DOCUMENTS

| | | | | |
|---|---|---|---|---|
| JP | 59-109852 | | 7/1984 | ............ E04G/1/30 |
| JP | 61-56450 | | 4/1986 | ........... E02D/17/20 |
| JP | 09248348 A | * | 9/1997 | ............. E06C/9/14 |
| JP | 2002121984 A | * | 4/2003 | ............. E06C/1/56 |
| JP | 2001146372 A | * | 5/2003 | ............. B66B/7/00 |
| JP | 2003129778 A | * | 5/2003 | ............. E06C/1/56 |
| JP | 2003129779 A | * | 5/2003 | ............. E06C/9/14 |

OTHER PUBLICATIONS

International Search Report mailed on May 29, 2001 for International Patent Application No. PCT/JP01/02320 published Apr. 10, 2001.

* cited by examiner

Primary Examiner—Robert E. Pezzuto
Assistant Examiner—Alexandra K. Pechhold
(74) Attorney, Agent, or Firm—Bromberg & Sunstein LLP

(57) ABSTRACT

A method of constructing catwalks and building scaffolds without cutting slopes, and without damaging mountainous areas, comprising the steps of 1) dropping at least two vertical ropes along a slope; 2) joining the vertical ropes by a set of upper and lower horizontal ropes, at a predetermined spaced interval; 3) joining these horizontal ropes to bar-like base structures; 4) erecting at least one pillar on the first base structure joined to the lower rope; 5) and placing and fixing plate-like structures on the second base structure joined to the upper horizontal rope and joined on the pillar or pillars.

24 Claims, 4 Drawing Sheets

METHOD FOR CONSTRUCTING STRUCTURES USEFUL AS SCAFFOLDS ON SLOPES

This application claims priority from International Application No. PCT/JP01/02320 filed on Mar. 23, 2001 which claims priority from Japanese Patent Application No. 2000-90429, filed Mar. 29, 2000, both of which are hereby incorporated herein by reference.

FIELD OF THE INVENTION

This invention relates to a method for constructing a structure to be used as a road or as a scaffold on a slope of a mountain or other similar places.

BRIEF DESCRIPTION OF DRAWINGS

In FIG. 6 a broken line shows the configuration of a slope before a road is constructed.

In FIGS. 1–7, 1 shows a vertical rope. 2 shows a slope. 3 and 4 show a transversal rope. 5 and 6 show a base structure. 7 shows a pillar. 8 shows a plate-form structure. 9 and 10 show fittings. 11 shows a flat section. 12 and 13 show a slope of a mountain. 14 shows a wall for a road. 21 shows a lift-type scaffold. 22 shows a slope. 23 shows a beam for a scaffold. 24 shows a fence for protection. 25 shows a work floor.

BACKGROUND OF THE INVENTION

Figure 5:
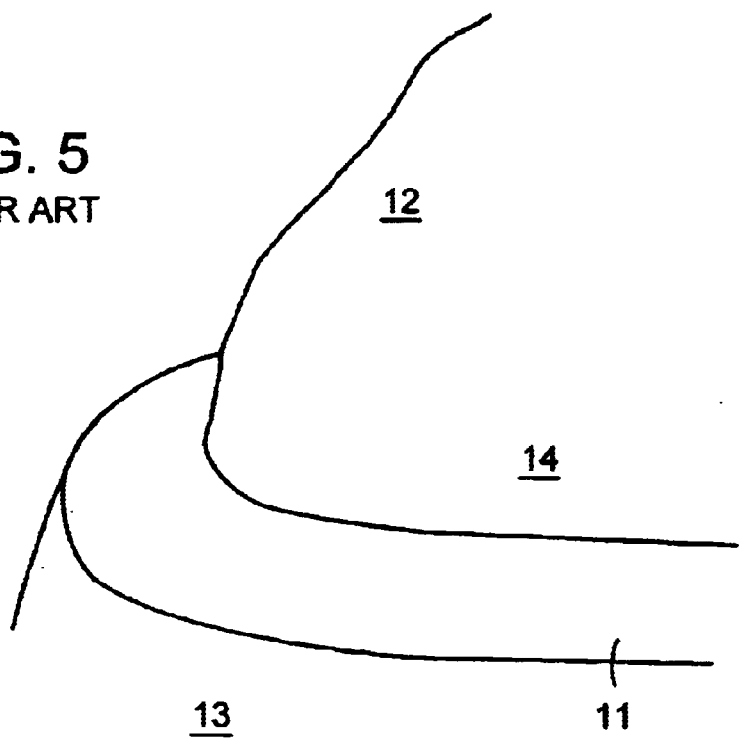
FIG. 5 is a schematic perspective view of a road constructed on a slope in a mountainous area according to the prior art.
Figure 6:
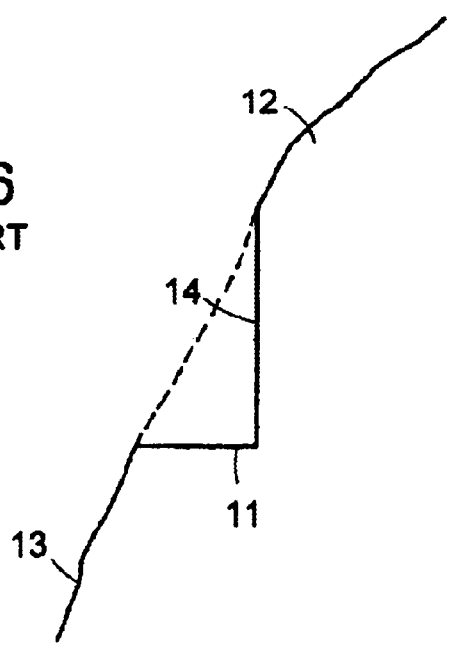
FIG. 6 is a schematic cross-sectional view of a slope in a mountainous area, explaining a road constructed on the slope according to the prior art.

In a conventional method for constructing a road with a gradual slope and a scaffold on a slope of a mountain as shown in FIGS. 5 and 6, the steps are comprised of cutting the slope in an L-shape, making a flat section 11 for a road or the like, and reinforcing slopes 12, 13 on the upper and lower sides of the flat section 11 and a wall 14 of the road according to the prior art. However, such a method greatly damages the mountainous area. Also, a large-scale construction is needed to cut a slope of a mountain and reinforce the cut part.

One example of the prior methods for arranging a scaffold on a slope of a mountain is shown in JP 2000-199580. This prior-art method uses a lift-type scaffold 21. The device 21 is provided with scaffold beams 23 along the slope 22. The work floor 25 with fences for protection 24 goes up and down along the scaffold beams 23.

Figure 7:
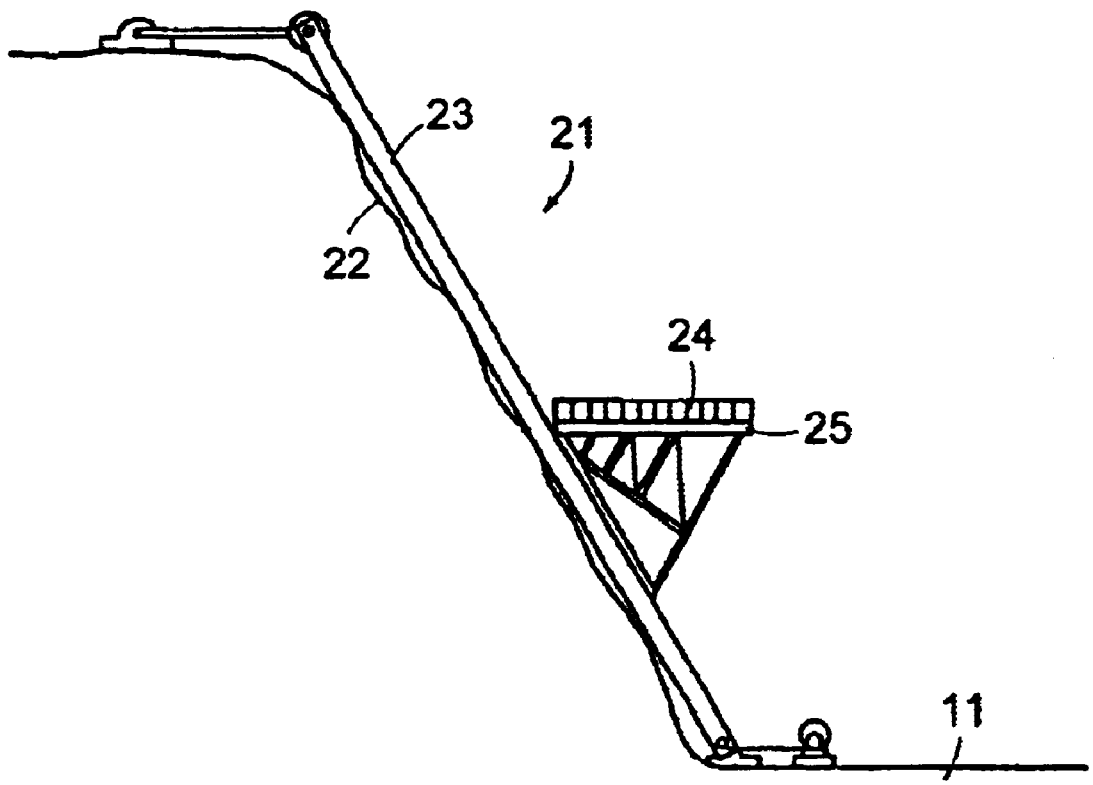
FIG. 7 is a schematic cross-sectional view of a scaffold constructed on a slope in a mountainous area according to the prior art.

This device 21 may be installed on a natural slope without cutting it. However, it is commonly considered necessary to previously cut a slope and make a flat section 11. Even when such a flat section is not needed, it is considered necessary to cut a slope if it projects outwardly as a whole, though it may be unnecessary to cut it if it is flat or concave in its entire configuration, as shown in FIG. 7.

The reason is because the support and settling of a scaffold beam on a projecting slope would become insufficient and difficult, if the projecting parts were not cut. Therefore, previous cutting of projecting parts of a slope is considered to be indispensable.

In the case of constructing the scaffold device 21 shown in JP2000-199580, the problem of damaging the mountainous area would often occur.

Scaffold beams 23 are arranged to smoothly lift a work floor to a high level. Thus, they are arranged to have a rigid construction with considerable strength and weight. Therefore, large-scale construction work was needed to install them safely and securely.

SUMMARY OF THE INVENTION

In view of the defects of such a conventional construction method, the inventor researched and developed the method for constructing a road or a scaffold on a slope of a mountain by way of smaller-scale construction work without damaging the mountainous area. This invention was devised as a result of such research and development. An object of this invention is to provide a method for constructing a structure used as a road or as a scaffold characterized by hanging ropes along a slope and arranging a structure thereon that is useful for a road site or a scaffold.

The first means for solving the problem according to this invention is a method for constructing a structure useful as a road or a scaffold on a slope, comprising the steps of hanging at least two vertical ropes along the slope, connecting to said vertical ropes at least one set of two transversal ropes spaced apart at a predetermined interval, connecting a bar-type base structure to each of the transversal ropes so that the transversal ropes support the base structure, putting up at least one pillar on a first bar-type base structure connected with a lower transversal rope, putting a plate-form structure on the second bar-type base structure connected with an upper transversal rope and at least one said pillar connected with the lower transversal rope, and fixing the plate-form structure to said second base structure and said pillar or pillars.

The second means for solving the problem according to this invention is a method for constructing a structure useful as a road or a scaffold on a slope, comprising the steps of hanging at least two vertical ropes along a slope, said vertical ropes being connected with at least one set of two transversal ropes spaced apart at a predetermined interval, connecting a bar-type base structure to each of the transversal ropes, so that the transversal ropes support the base structure, putting up at least one pillar on a first bar-type base structure connected with a lower transversal rope, putting a plate-form structure on a second bar-type base structure connected with an upper transversal rope and said at least pillar or pillars, and fixing said plate-form structure to said second base structure and said pillar or pillars.

Furthermore, the third means for solving the problem according to this invention is a method for constructing on a slope a structure useful as a road or a scaffold, comprising the steps of hanging at least two vertical ropes on a slope, said vertical ropes being connected with at least one set of two transversal ropes spaced apart at a predetermined interval, each of said transversal ropes being connected with a bar-type base structure, so that the transversal ropes support the base structure, putting up at least one pillar on a first bar-type base structure connected with a lower transversal rope, putting a plate-form structure on a second bar-type base structure connected with an upper transversal rope and said pillar or pillars, and fixing the plate-form structure to said second base structure and said pillar or pillars.

The plate-form structure preferably contains a fence around its periphery. After the plate-form structure is fixed to the second base structure and said pillar or pillars, the fence is preferably fixed to the periphery of the base structure.

When the structure forms a road, a rather long plate-form structure is often used. Therefore, the number of pillars for supporting the plate-form structure is more than one. At least two of the pillars are preferably put up on each side of the base structure.

When the structure is used as a scaffold, two or more sets of transversal ropes are preferably connected with vertical ropes, so that the plate-form structures are preferably arranged, like stairs, along the slope.

Furthermore, this invention also concerns a road and a scaffold constructed according to the above-described methods.

DETAILED EXPLANATION OF THE INVENTION

By referring to the drawings, this invention is concretely explained as follows.

Figure 1:
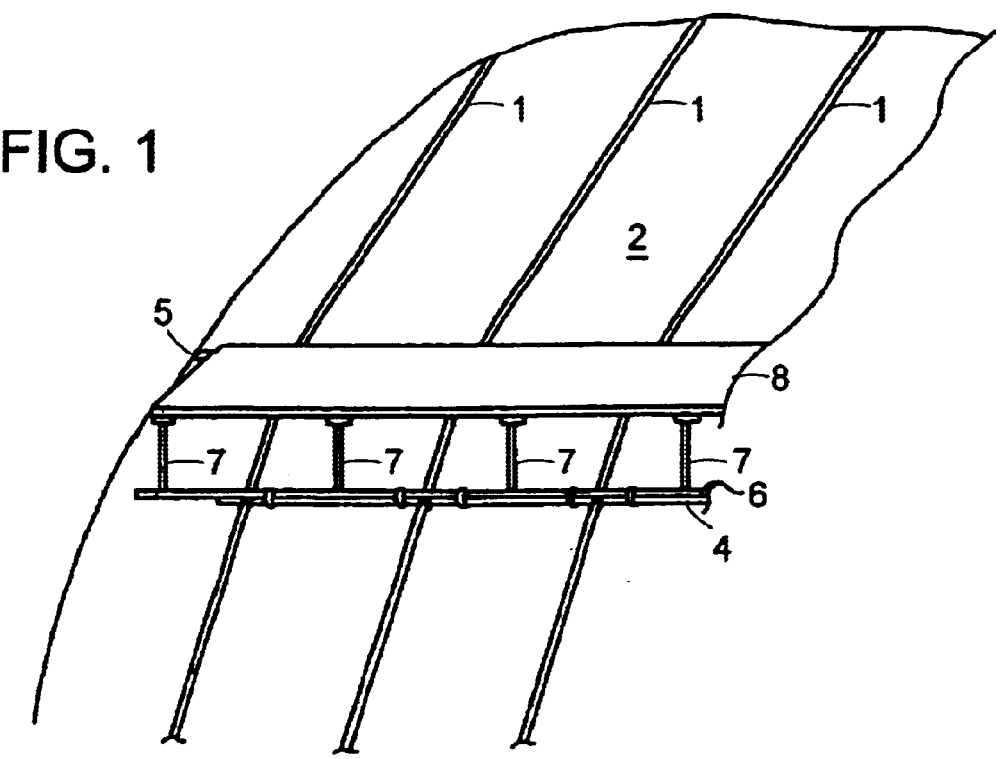
FIG. 1 is a schematic perspective view of a road constructed on a slope in a mountainous area according to the method of this invention.
Figure 2:
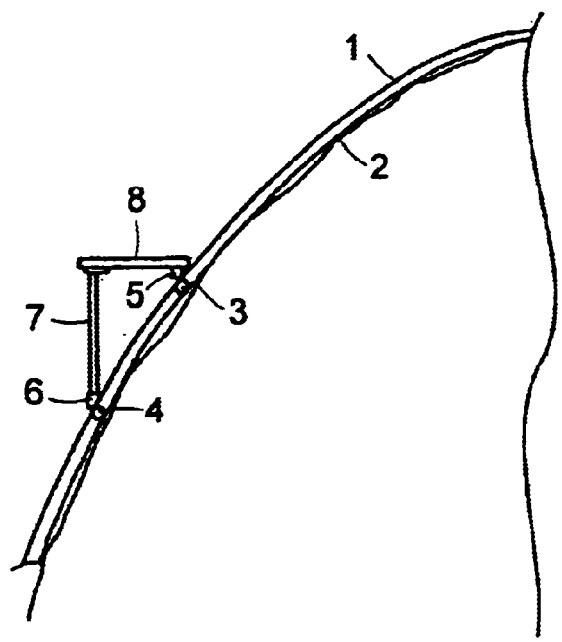
FIG. 2 is a schematic cross-sectional view of a road constructed on a slope in a mountainous area according to the method of this invention.

FIG. 1 is a schematic perspective view of a road constructed on a slope in a mountainous area according to the method of this invention. FIG. 2 is a schematic cross-sectional view of the road.

In the first embodiment of this invention, at first two or more vertical wire ropes 1, 1, spaced apart at a predetermined interval, are hung along the slope from a higher topographical point, for example, the top of a mountain. Subsequently, two transversal wire ropes 3, 4, spaced apart in a predetermined interval, are connected with said vertical ropes 1, 1. A bar-type base structure 5 or 6 is connected to each of transversal ropes 3, 4 in order to be supported by the rope 3 or 4. At least one pillar 7 is put up on the first base structure 6 connected with a lower transversal wire rope 4. The plate-form structure 8 is put on and fixed to the second base structure 5 connected with the upper transversal rope 3 and the pillar 7.

In the second embodiment of the invention, transversal ropes 3, 4 are previously connected to at least two vertical ropes 1, 1. A net-form structure thus made of the vertical ropes 1, 1 and transversal ropes 3, 4 are hung along a slope. The steps of the method of the second embodiment after this are accomplished in the same way as in the case of the first embodiment.

In the third embodiment of the invention, transversal ropes 3, 4 are previously connected to two vertical ropes 1, 1. Subsequently, bar-type base structures 5, 6 are connected to said transversal wire ropes 3, 4 to be supported by them. Such vertical ropes 1, 1, accompanied by the transversal ropes 3, 4, with the bar-type base structures 5, 6, are hung along a slope. After putting up at least one pillar on the first base structures 5, 6 connected to the lower transversal ropes 3, 4, the steps of the method of the third embodiment are accomplished in the same way as in the case of the first embodiment.

Additionally, after hanging at least two vertical ropes from a top of a mountain as an example, the steps of connecting the base structures 5, 6 with the transversal ropes 3, 4, putting up pillars and putting a plate-form structure are carried out in accordance with any method belonging to the prior art. For example, the steps can be carried out by preparing a jib crane at the foot or the top of a mountainous area, to carry materials for use to a predetermined spot by the jib crane, and to lift a box-shape elevator for operators to carry out a combining operation, etc., being hung along vertical ropes suspended from the top of the mountainous area. For another example, the steps can be carried out by using robots for construction.

Figure 4:
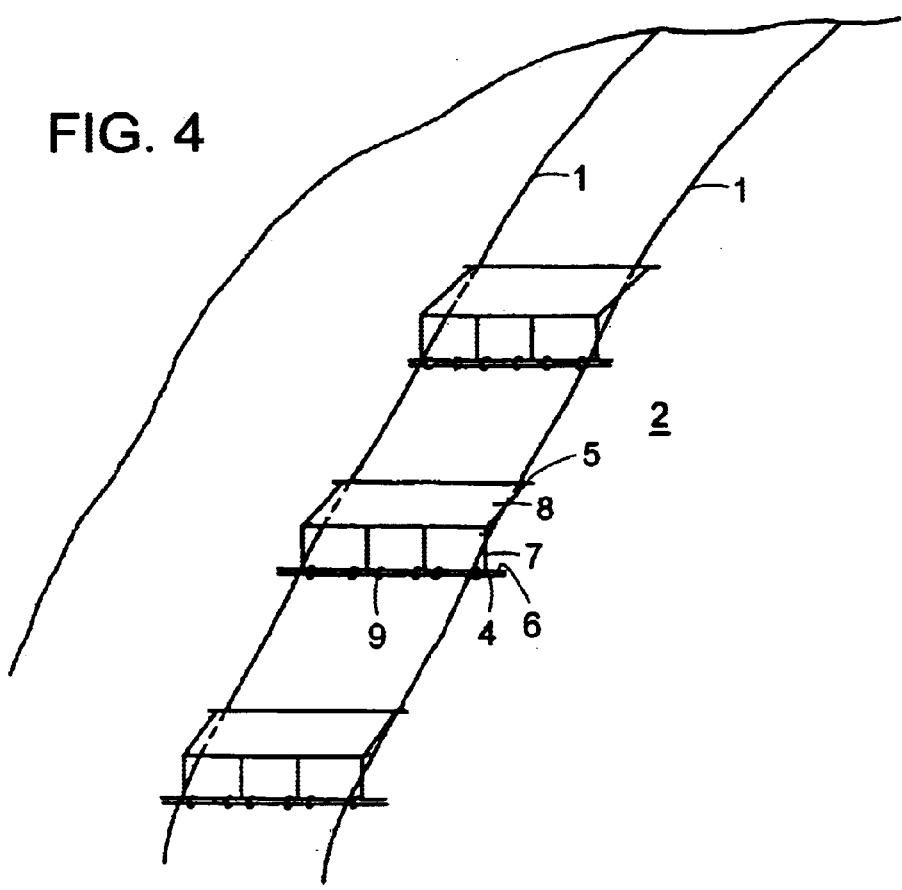
FIG. 4 is a schematic perspective view of scaffolds arranged on a slope in a mountainous area according to the method of this invention.

FIG. 4 shows a schematic perspective view of scaffolds arranged on a slope of a mountain in accordance with this invention.

These scaffolds can be built by way of the methods of said first, second, and third embodiments. As shown in FIG. 4, at least two sets of transversal ropes 3, 4 are preferably connected with at least two vertical ropes 1, 1. Plate-form structures 8 are arranged, preferably like stairs, along the slope 2.

Any materials with the strength and water resistance required in this invention can be used as vertical and transversal ropes. One example is a wire rope. The strength of wire ropes practically used at present can firmly fix and support base structures and plate-form structures. There are various kinds of wire ropes other than as specified in JIS G3525. Depending on the kind of the surface treatment, twist, diameter, etc., the shearing or rupturing load of the rope suffers wide changes, too.

Considering various conditions such as the location where the road or scaffold is installed, the scale of construction, and the kinds of material used other than ropes, etc., the wire ropes to be used may be chosen to suit the purpose. A steel chain is another example of the material used for the vertical and transversal rope.

To hang vertical ropes along a slope from a higher topographical point, for example, the top of a mountain, the ropes can be secured to heavy weights as anchors, based on well-known technology. Concrete blocks, metal mass, and wire-cylinders or baskets filled with concrete blocks are examples of such anchors. Also, a big tree, a concrete-built structure rooted in the ground, etc., may be used for an anchor.

For combining or joining a vertical and a transversal rope, or wire ropes, knotting them or connecting them using conventional joining devices may be done.

The bar-type base structure may preferably be made of a rigid material such as concrete or metals. However, the material may be wood, etc., for short-term use. As for the configuration, a round bar-shape and a square bar-shape may be available. As the second base structure connected with an upward transversal rope directly supports the plate-form structure so as to form the road site or the scaffold, at least one flat surface is needed. Therefore, the square bar-shaped one is preferable.

Figure 3:
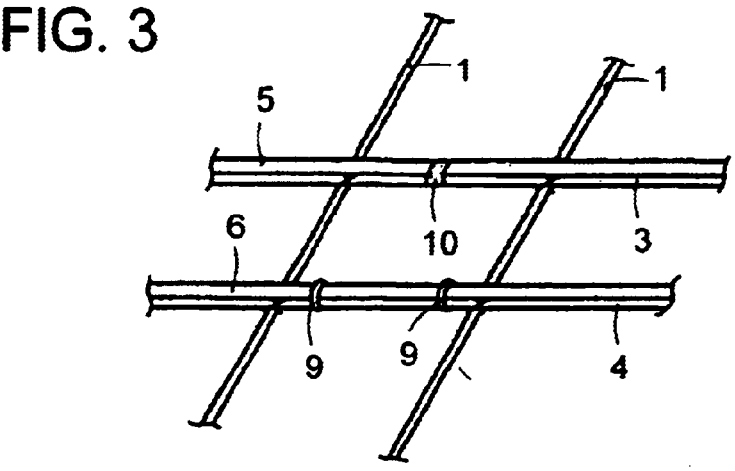
FIG. 3 is a schematic perspective view of a combination of vertical ropes and transversal ropes, and a bar-type base structure combined and supported with said transversal ropes.

The base structure may be combined with a transversal rope using any prior art. FIG. 3 shows one of its examples.

In this example, to connect the first base structure 6 to the lower transversal rope 4, a link 9 is used that forms a ring by being engaged.

The reason that the ring-shaped link 9 can be used is because there is no obstruction on the top surface of the first base structure 6 except where pillars will be provided.

Therefore, a string-form product such as a rope having appropriate strength may be used to connect or join the first base structure 6 to the lower transversal rope 4, particularly by binding them tightly.

On the other hand, a U-shaped link 10 is used for combining or joining the second base structure 5 with an upper transversal rope 3. This is because, as the plate-form structure 8 must be put directly on the top surface of the second base structure 5, there should not be any joining member that might interfere with the installment of the plate-form structure.

The material of the pillar is preferably a rigid material like that of the first base structure, such as concrete or metal. Also, wood may be used for a short-term application. The configuration should be one such as a cylinder or square rod. The pillar usually has a flat top to put a plate-form structure thereon.

A pillar is built on the first base structure by putting up the pillar in a hole made in the first base structure or by connecting the pillar with a top face or a side face of the first base structure by using a connecting device.

In the case of building a road, many pillars are preferably put up on the first base structure at a predetermined interval, as a road can extend for a great distance in the longitudinal direction.

In the case of building a scaffold, only one pillar may often be used in the middle part of the first base structure connected to the lower transversal rope, as the plate-form structure is mainly supported by the second base structure in an upper position connected with the upward transversal rope, which base structure is often short in the longitudinal direction.

However, at least two pillars may preferably be provided at least in both ends of the first base structure connected with the lower transversal rope.

The material for the plate-form structure is not limited to specific ones. For example, wood, concrete, metal, etc., can be used.

In addition, in the case of using wood as the material, it is desirable to use a wood whose surface is treated for corrosion resistance.

The method for securing the plate-form structure to the second base structure and pillars can be any of the conventional ones. For example, they may be secured by using a bolt and nut, by a tight connection by insertion, or by connecting metal fittings.

In addition, the fence around the plate-form structure can be provided after securing it to the second base structure and pillar, or, the plate-form structure with a fence around the periphery can be prefabricated prior to mounting it on the second base structure and pillar.

According to this invention, the construction structure useful for a road and a scaffold can be built without damaging a mountainous area. Moreover, construction can be carried out easily in a short period and with a limited cost, as it is unnecessary according to this invention to remove a part of a mountainous area and/or reinforce it.

If a landslide or an avalanche takes place in a mountainous area, earth and sand and/or snow will just pass over the scaffold structure for construction built according to this invention. The scaffold structure for construction would not be exposed to the destructive power of the landslide or avalanche. Therefore, the scaffold structure built by the method of this invention is useful as a shelter, considering that in such a case it would provide a shelter under itself.

Additionally, when scaffolds are built like stairs according to this invention, construction is easily carried out in a mountainous area by lifting materials sequentially by using those scaffolds.

What is claimed is:

1. A method for constructing a plate-form structure on a slope, the method comprising:

hanging at least two vertical ropes along the slope;

connecting to the vertical ropes at least a first upper and a first lower transversal rope, the first upper and first lower transversal ropes being spaced apart at a predetermined interval;

supporting a first bar-type base structure with first lower transversal rope and a second bar-type base structure with the first upper transversal rope;

putting up at least one pillar on the first bar-type base structure;

putting a first plate-form structure on the second bar-type base structure and the at least one pillar; and fixing the first plate-form structure to the second bar-type base structure and to the at least one pillar.

2. A method according to claim 1, further comprising:

providing a fence on a peripheral part of the first plate-form structure.

3. A method according to claim 1, wherein putting up at least one pillar on the first bar-type base structure includes putting up at least two pillars on the first bar-type base structure such that one pillar is located at each of first and second ends of the first bar-type base structure.

4. A method according to claim 1, further comprising:

connecting to the vertical ropes to at least a third transversal rope, the third transversal rope being below the first lower transversal rope and spaced apart from the first lower transversal rope at a predetermined interval;

supporting a third bar-type base structure with the third transversal rope;

putting up at least one pillar on the third bar-type base structure;

putting a second plate-form structure on the first bar-type base structure and the at least one pillar on the third bar-type base structure; and fixing the second plate-form structure to the first bar-type base structure and to the at least one pillar on the third bar-type base structure.

5. A method according to claim 1, further comprising:

connecting to the vertical ropes at least a second upper and a second lower transversal rope, the second upper and second lower transversal ropes being spaced apart at a predetermined interval;

supporting a third bar-type base structure with second lower transversal rope and a fourth bar-type base structure with the second upper transversal rope;

putting up at least one pillar on the third bar-type base structure;

putting a second plate-form structure on the fourth bar-type base structure and the at least one pillar on the third bar-type base structure; and fixing the second plate-form structure to the fourth bar-type base structure and to the at least one pillar on the third bar-type base structure.

6. A method according to claim 5, wherein the first and second plate-form structures are arranged like stairs.

7. A road constructed in accordance with the method of claim 3.

8. A scaffold constructed in accordance with the method of claim 1.

9. A method for constructing a plate-form structure on a slope, the method comprising:
hanging at least two vertical ropes along the slope, the vertical ropes being connected by at least a first upper and a first lower transversal rope, the first upper and first lower transversal rope being spaced apart at a predetermined interval;
supporting a first bar-type base structure with first lower transversal rope and a second bar-type base structure with the first upper transversal rope;
putting up at least one pillar on the first bar-type base structure;
putting a first plate-form structure on the second bar-type base structure and the at least one pillar; and
fixing the first plate-form structure to the second bar-type base structure and to the at least one pillar.

10. A method according to claim 9, further comprising:
providing a fence on a peripheral part of the first plate-form structure.

11. A method according to claim 9, wherein putting up at least one pillar on the first bar-type base structure includes putting up at least two pillars on the first bar-type base structure such that one pillar is located at each of first and second ends of the first bar-type base structure.

12. A method according to claim 9, further comprising:
connecting to the vertical ropes to at least a third transversal rope, the third transversal rope being below the first lower transversal rope and spaced apart from the first lower transversal rope at a predetermined interval;
supporting a third bar-type base structure with the third transversal rope;
putting up at least one pillar on the third bar-type base structure;
putting a second plate-form structure on the first bar-type base structure and the at least one pillar on the third bar-type base structure; and
fixing the second plate-form structure to the first bar-type base structure and to the at least one pillar on the third bar-type base structure.

13. A method according to claim 9, further comprising:
connecting to the vertical ropes at least a second upper and a second lower transversal rope, the second upper and second lower transversal ropes being spaced apart at a predetermined interval;
supporting a third bar-type base structure with second lower transversal rope and a fourth bar-type base structure with the second upper transversal rope
putting up at least one pillar on the third bar-type base structure;
putting a second plate-form structure on the fourth bar-type base structure and the at least one pillar on the third bar-type base structure; and
fixing the second plate-form structure to the fourth bar-type base structure and to the at least one pillar on the third bar-type base structure.

14. A method according to claim 13, wherein the first and second plate-form structures are arranged like stairs.

15. A scaffold constructed in accordance with the method of claim 9.

16. A road constructed in accordance with the method of claim 11.

17. A method for constructing a plate-form structure on a slope, the method comprising:
hanging at least two vertical ropes along the slope, the vertical ropes being connected by at least a first upper and a first lower transversal rope, the first upper and first lower transversal rope being spaced apart at a predetermined interval, the first lower transversal rope supporting a first bar-type base structure and first upper transversal rope supporting a second bar-type base structure;
putting up at least one pillar on the first bar-type base structure;
putting a first plate-form structure on the second bar-type base structure and the at least one pillar; and
fixing the first plate-form structure to the second bar-type base structure and to the at least one pillar.

18. A method according to claim 17, further comprising:
providing a fence on a peripheral part of the first plate-form structure.

19. A method according to claim 17, wherein putting up at least one pillar on the first bar-type base structure includes putting up at least two pillars on the first bar-type base structure such that one pillar is located at each of first and second ends of the first bar-type base structure.

20. A method according to claim 17, further comprising:
connecting to the vertical ropes to at least a third transversal rope, the third transversal rope being below the first lower transversal rope and spaced apart from the first lower transversal rope at a predetermined interval;
supporting a third bar-type base structure with the third transversal rope;
putting up at least one pillar on the third bar-type base structure;
putting a second plate-form structure on the first bar-type base structure and the at least one pillar on the third bar-type base structure; and
fixing the second plate-form structure to the first bar-type base structure and to the at least one pillar on the third bar-type base structure.

21. A method according to claim 17, further comprising:
connecting to the vertical ropes at least a second upper and a second lower transversal rope, the second upper and second lower transversal ropes being spaced apart at a predetermined interval;
supporting a third bar-type base structure with second lower transversal rope and a fourth bar-type base structure with the second upper transversal rope
putting up at least one pillar on the third bar-type base structure;
putting a second plate-form structure on the fourth bar-type base structure and the at least one pillar on the third bar-type base structure; and
fixing the second plate-form structure to the fourth bar-type base structure and to the at least one pillar on the third bar-type base structure.

22. A method according to claim 21, wherein the first and second plate-form structures are arranged like stairs.

23. A road constructed in accordance with the method of claim 19.

24. A scaffold constructed in accordance with method of claim 17.

* * * * *